United States Patent [19]
Lukens

[11] 3,725,706
[45] Apr. 3, 1973

[54] HEAT TRANSFER SYSTEM FOR DYNAMOELECTRIC MACHINE

[75] Inventor: Alan Franck Lukens, Schenectady, N.Y.

[73] Assignee: General Electric Company, Schenectady, N.Y.

[22] Filed: July 26, 1971

[21] Appl. No.: 165,950

[52] U.S. Cl. ................................................310/62
[51] Int. Cl. ...............................................H02k 9/06
[58] Field of Search..........310/52, 53, 58, 59, 62, 63, 310/65

[56] References Cited

UNITED STATES PATENTS

| | | |
|---|---|---|
| 3,518,467 | 6/1970 | Wightman............................310/63 |
| 3,383,529 | 5/1968 | Baumann............................310/52 |
| 3,407,317 | 10/1968 | Honsinger............................310/58 |
| 2,778,958 | 1/1957 | Hamm...................................310/63 |
| 3,610,975 | 10/1971 | Onjanow..............................310/63 |
| 3,544,820 | 12/1970 | Wightman............................310/52 |

Primary Examiner—R. Skudy
Attorney—John J. Kissane et al.

[57] ABSTRACT

A dripproof dynamoelectric machine is described wherein air is admitted through the end shields directly into the end turn cavities at opposite ends of the machine to be circulated across the radially inner faces of the end turns before being expelled from the end of the machine whereat the air was admitted. The exhaust air then is directed across the motor frame by a shroud overlying the exhaust apertures to cool the stator by the transfer of heat from the stator laminations through the frame to the air circulating across the frame. Preferably the frame is finned to maximize the heat transfer surface in contact with the flowing air and the fans are secured to the rotor end rings. For increased volumetric flow of the air through the motor, the fans utilized to circulate the air through the end turn cavities underly the end turns adjacent the stator laminations and extend radially outward beyond the stator end turns to overlie the end turns.

3 Claims, 3 Drawing Figures

INVENTOR.
ALAN F. LUKENS

HEAT TRANSFER SYSTEM FOR DYNAMOELECTRIC MACHINE

BACKGROUND OF THE INVENTION

The present invention relates to dynamoelectric machines and, in particular, to a dynamoelectric machine ventilation scheme permitting a single frame to be utilized for both totally enclosed or drip-proof operation.

One of the major limitations encountered by designers in attempting to provide maximum machine output for a given frame size is the problem of heat dissipation. As increased current flows through the machine windings, joulean heating of the windings plus the heat generated within the magnetic members of the machine due to increased hysteresis and eddy currents tend to raise the operating temperature of the machine. If this heat buildup is not somehow mitigated, the electrical insulation of the machine deteriorates producing electrical failure. The heat dissipating qualities of a machine thus are manifestly important in determining the amount of power which may be applied to, and extracted from, a given frame size.

Many ways of cooling dynamoelectric machines have been devised, including sealed liquid cooling systems, elaborate pumping means for circulating coolant within totally enclosed machines, and means for circulating ambient air through and about machines having open, or drip-proof, housing. Often, a fan or impeller is disposed at one end of the drip-proof machine and air is pumped into the stator housing for distribution through the machine. It will be appreciated that as the air circulates through the machine, the temperature of the air continuously increases thereby reducing the thermal absorption of air progressing axially downstream within the machine. Not only does such a ventilation system fail to homogeneously cool the machine, but the asymmetrical design of the machine necessitates dissimilar end shields, bearing housings and fan means at opposite ends of the machine. The number of dissimilar parts which must be stocked to assemble and service such machines therefore is increased.

To reduce the aforementioned inventory problem, dynamoelectric machines have been designed in a symmetrical configuration with identical fans and end shields being situated at both ends of the machine to draw ambient air over the stator end turns before exhausting the air in axially opposite directions across the exposed outer surface of the stator laminations. A majority of the exhausted air however does not thermally communicate with the exposed stator laminations because of locatized air turbulence at the edges of the laminations and heat transfer from the stator is limited. Other drip-proof machines draw ambient air across the end turns at both ends of the machine before expelling the air through a narrow gap between the stator core and the housing within which the core is located. The cooling air absorbs heat from the stator core and from whatever protrusions or members are provided for supporting the core within the housing. Because the supports are necessarily relatively short and thick in order to provide the necessary rigidity and strength to support the core within the housing, the heat transfer properties of such machine are comprised reducing the maximum output of the machine.

SUMMARY OF THE INVENTION

It is therefore an object of the present invention to provide a dynamoelectric machine having an improved ventilation scheme.

It is another object of the invention to provide a fan-cooled dynamoelectric machine having a stator frame suitable for either drip-proof or totally enclosed operation.

It is a further object of the present invention to provide a dynamoelectric machine having improved means for impelling air axially along the stator housing.

A dynamoelectric machine, referred to hereinafter as a motor for ease of description, in accordance with this invention characteristically includes a frame having a cylindrical wrapper circumferentially disposed in intimate contact with the stator core and a plurality of elongated cooling fins extending outwardly from the cylindrical wrapper to enhance cooling of the stator core. The frame preferably is made of a material such as aluminum which exhibits high thermal conductivity and the fins are elongated to maximize thermal transfer from the motor without increasing the diameter of the motor housing. At each end of the machine are symmetrical end shields having air inlets therein while a generally conical baffle is disposed between the air inlets and the stator end turns for guiding newly admitted air into the radial center of the machine. The air is then impelled radially outward by symmetrically disposed fans and the air impinges upon the outermost periphery of the end shields to be propelled in axially opposite directions along the finned surface of the motor. In one embodiment of this invention, extended, curved fan blades are utilized to direct air about the stator winding end turns while in an alternate embodiment, generally rectangular fan blades extending axially from opposite ends of the rotor serve to circulate air through the motor.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
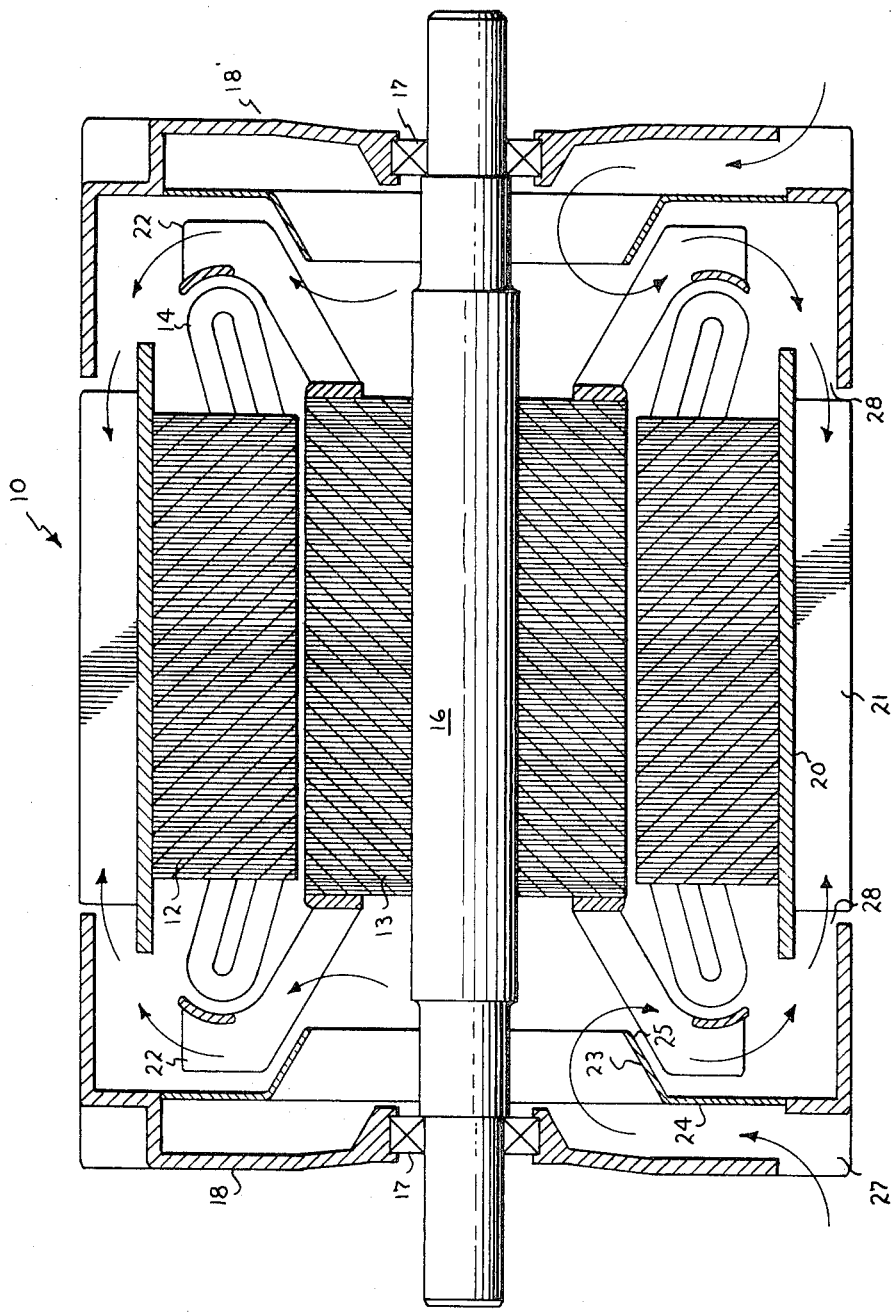
FIG. 1 is a sectional side view of a motor embodying features of the present invention.

An open ventilation squirrel cage induction motor 10 in accordance with this invention is depicted in FIG. 1 and generally includes a stator 12 circumferentially disposed about rotor 13 for electromagnetic interaction therewith upon energization of stator windings 14. The rotor is of typical squirrel cage design and is characterized by a plurality of magnetic laminations stacked in registration upon shaft 16 which shaft is rotatably journaled within bearings 17 retained within end shields 18 and 18', respectively. In conventional fashion, rotation of the rotor is effected by magnetic fields generated by current flow through stator winding 14 extending axially through slots (not shown) formed along the radially inner surface of laminated stator 12. The stator is mounted within a frame or housing 20 which advantageously is cylindrical in configuration with the laminations being retained within the housing by any conventional means, preferably in interference fit with the housing to maximize the transfer of heat from the laminations to the housing. External of the housing and integral therewith are a plurality of longitudinally extending fins 21 which have a substantial height, i.e., span from housing 20, to increase heat transfer from the motor. Thus, while the fins may provide some additional strength and rigidity to stator housing 20, the primary function of the fins is to transmit heat absorbed from the stator laminations to the air stream propelled in axially opposite directions by fan blades 22 situated at opposite ends of the motor.

It will be seen that end shields 18 and 18' may be identical, facilitating the provision of a fully symmetrical cooling system. For purposes of illustration, end shield 18 and associated cooling means located at the drive end of motor 10 will be discussed, it being understood that the end shield 18' and associated cooling means disposed at the opposite drive end of the motor are identical thereto and function in an identical manner. The direction of air flow into the motor end turn cavity is controlled by a baffle 23 having a radially outwardly flaring periphery 24 and a trunketed conical center section 25. Suitable means (not shown) are provided along the outer edge of the baffle to fixedly secure the baffle to the adjacent end shield. Fan blades 22 preferably extend from the ends of rotor 13 to an axial location beyond the protruding end turns of stator windings 14 whereupon the outer extremities of the fan blades flange radially outward following the contour of the inner surface of baffle 23 to overlie the stator end turns. At least one fan (22) must be seperable for assembly purposes. The fans draw ambient air, illustrated by the arrows, through apertures 27 situated along the bottom and sides (to preclude solid particles from being drawn into the motor interior) into the region between the end shield and baffle whereupon the incoming air is impelled by the fans across the protruding end turns of stator winding 14. After cooling the radially inner face of the end turns, the air is exhausted through vents 28 between frame 20 and the axially inward extension of end shield 18 to cool the motor laminations by conduction of heat through frame 20 to the axially flowing air stream. Thus, the motor interior is cooled by a high volume of air flowing from the end turn cavities in axially opposite directions across the motor housing rather than by conventional air flow through a passage between the stator and housing. Moreover, because there is no outer enclosure atop fins 21 confining the flowing air streams in the drip-proof construction illustrated in FIG. 1, turbulent interaction of the air streams at the axial center of the motor (characteristic of oppositely directed air streams in a confined region) is minimized.

To assure maximum heat transfer from the stator laminations to the oppositely directed air streams flowing longitudinally down the exterior of the motor, the motor frame and fins should be fabricated of a metal, preferably cast aluminum having high thermal conductivity, and the stator laminations should directly contact the overlying frame. Fins 21 also should extend approximately the entire length of the stator core in a longitudinal direction. Because the fins are externally situated, the fins can be elongated in an outward direction contrary to the relatively shorter fins customarily used between the laminations and the external housing of enclosed motors.

Figure 2:
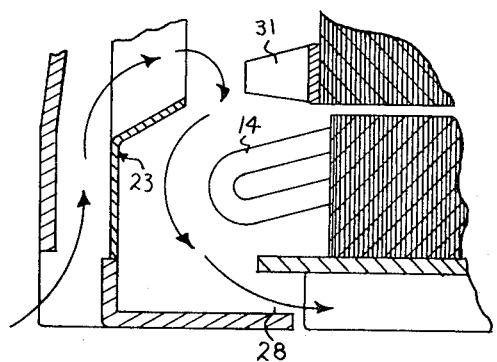
FIG. 2 is a partial sectional view of a motor showing alternative fan means suitable for use with the present invention.

FIG. 2 shows the end turn region of a motor having nominal rotor diameter fan blades 31 rather than the bigger diameter blades characteristic of the motor illustrated in FIG. 1. Other than the configuration of the fan blades, the motors of FIG. 1 and FIG. 2 are structurally identical. Geometrically, blades 31 are rectangular planar members extending axially from the ends of the rotor and are characterized by a maximum diameter no greater than the diameter of the rotor laminations. The outer extremities of the fan blades, therefore, do not extend about the end turns and the volume of air flow through vents 28 is somewhat reduced. Nonetheless, the fan configuration shown in FIG. 2 provides an adequate flow of air for cooling the machine in many cases and manufacture of the rotor is simplified.

Figure 3:
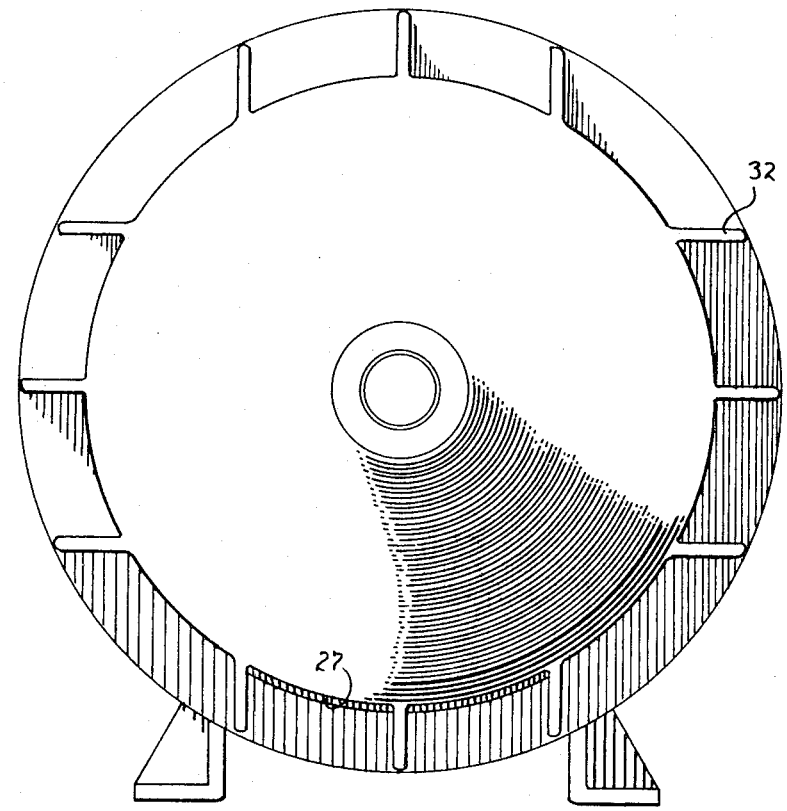
FIG. 3 is an end view of a motor showing the outer end shield configuration.

FIG. 3 is an end view of a motor such as those depicted in FIG. 1 and 2 and illustrated end shield fins 32 which serve to shield those apertures 27 located along the lower surface of the end shield from falling solids or liquids to inhibit contamination of the machine interior.

Referring back to FIG. 1, when motor 10 is energized, rotor 13 and attached fan blades 22 begin to rotate causing air situated adjacent the fan blades to be impelled radially outward. The low pressure area produced by the displacement of the air causes ambient air to be drawn through apertures 27 and the air flows radially inward along the front surface of baffles 23 before being drawn into the end turn cavities through the openings defined by the conical center of the baffles. The flowing air streams cool the radially inner faces of the stator winding end turns before flowing through vents 28 defined by the concentric overlapping ends of stator housing 20 and end shields 18 and 18', respectively. The air streams then pass between fins 21 to absorb heat conducted to the frame from the stator laminations before being deflected radially outward at the axial center of the motor.

It will be seen that the fans serve a two-fold purpose, i.e., to impel air across the radially inner face of the stator end turns and to impel air axially inward between fins 21 to transfer heat by conduction from the stator interior to the flowing air streams.

As set forth above, motor 10 is symmetrical in design and cooling air is directed across the stator housing 20 in both directions before the streams meet and are diverted away from the stator housing. The advantages in such an arrangement are manifest, since both end turn cavities receive air at approximately the same low temperature and cooling of the motor is thus more uniform relative to motors drawing air into only one end turn cavity. Moreover, the air flows need not traverse the entire length of the stator, and any temperature gradient along the stator therefor is reduced.

Further advantages inherent in the present embodiment reside in the fact that the end shields and cooling means associated therewith at each end of the machine may be of a single, common design and it is thus only necessary to manufacture a single configuration of end shield, baffle and fan means for motor operation.

A still further beneficial aspect of the inventive embodiment is that housing 20 lends itself to use in combination with end shields adapted for totally enclosed motor operation. More specifically, open end shields 18 and 18' and attached baffles 23 are removed from the motor illustrated in FIG. 2 and closed end shields (not shown) are substituted therefor to totally enclose the motor. Desirably, these end shields are formed of a high thermal conductivity metal, e.g., aluminum, and are provided with internal and external fins to maximize air to air heat transfer. A large radial fan (not shown) also is mounted on the rotor shaft at the opposite drive end of the motor and the fan is enclosed by a suitable casing to direct air across the external surface of the adjacent end shield and down the frame of the motor from the opposite drive end in the totally enclosed configuration. Although totally enclosed motors of this configuration are not new, per se, the symmetrical design of the motor illustrated in FIG. 1 permits the utilization of totally enclosed motor frames in an open, or drip-proof design.

As will be evident from the foregoing description, certain aspects of the invention are not limited to the particular details of construction of the examples illustrated and it is therefore contemplated that other modifications or applications will occur to those skilled in the art. For example, fan 22 could be attached to shaft 16 rather than the rotor end ring (as illustrated in FIG. 1) or fans of differing size and/or configurations could be employed to impel air from the end turn cavities in opposite directions down the exterior surface of the stator frame. When geometrically different fans are employed, the air streams are deflected away from the machine near the motor center at an axial location more proximate the less powerful fan. It is therefore intended that the appended claims shall cover all such modifications and applications as do not depart from the true spirit and scope of the invention.

What I claim and desire to secure by Letters Patent of the United States is:

1. A dynamoelectric machine comprising:
   a rotor having an axial shaft journaled for rotation,
   a stator formed of a plurality of annular magnetic laminations stacked in registration to form a bore for said rotor, said stator having a winding with coil sides disposed within slots in said magnetic laminations and end turns protruding beyond the ends of said laminations,
   a housing circumferentially disposed about the periphery of said stator laminations, said housing directly contacting the entire circumferential edges of said laminations to permit the transfer of heat therebetween,
   a plurality of spaced fins disposed about the periphery of said housing and extending axially along said housing for substantially the entire length of the stator core, said fins having a radially inner edge in contact with said housing and a radially outer edge open to the atmosphere,
   end shields mounted at opposite ends of said machine, each of said end shields having a cooling intake orifice, the diameter of said end shields proximate said stator housing being larger than the diameter of said housing to form air exhaust orifice between said housing and said end shields, the axially inner edge of said end shields circumferentially overlying the ends of said stator frame to form an air directing region therebetween, and
   fan means mounted at opposite ends of said rotor for drawing air into both ends of said machine to pass over the radially inner faces of said end turns, said fan means drawing the entire air streams flowing into said machine through unobstructed apertures in said end shields into direct contact with the end turns situated between said stator and said end shields, said air streams being impelled radially outward by said fan means to pass across the radially inner face of said end turns before flowing radially outward to the air directing region between said end shield and said stator frame situated at the end of the machine through which said air streams were respectively admitted, said air streams being directed in axially opposite directions along the exterior surface of said housing to pass between said fins and absorb heat conducted from said stator through said housing, said air being deflected radially outward away from said machine near the axial center of said machine.

2. A dynamoelectric machine as defined in claim 1 wherein at least one of said fan means is characterized by a radially outer portion contoured to overlie and extend axially beyond said end turns, said machine further including a baffle disposed between the end shield adjacent said one fan means and said one fan means, the outer extremities of the blades of said fan following the axially inner contour of said baffle means.

3. In a dynamoelectric machine having a stator and a rotor journaled for rotation therein, said stator including an aluminum housing having cooling fins disposed axially on the outer surface thereof and extending substantially the entire axial length of the stator, cooling means comprising:
   fan means mounted on the rotor end ring at each end of said rotor for rotation therewith;
   a pair of end shields adapted to be mounted at opposite ends of said stator, each of said end shields having inlet means at the axially outward end of said end shields and outlet means disposed about the periphery of the axially inward ends of said end shields between said end shields and said housing; said end shield outlet means being disposed in a confronting attitude with said cooling fins so that air flows from said outlet means pass in axially opposite directions between the cooling fins along the exterior of said housing before said air flows meet near the center of said machine and are deflected radially away from said machine, and
   annular baffle means adapted to be mounted within said end shields, said baffle means having a first portion which extends circumferentially inward about said shaft at the ends of said rotor and having a second portion which extends radially outward therefrom the meet said end shields, said baffle means defining an inlet channel extending from said inlet means to said shaft and an outlet channel extending from the end of said rotor to said end shield outlet means, the complete air flow through said machine passing unobstructedly through said inlet channel directly into communication with said fan means, said fan means impelling the air stream radially outward across the radially inner face of said end turns to said outlet channel for exhaust through the outlet means disposed at the end of the machine through which said air stream was admitted.

* * * * *